United States Patent
Ropiequet et al.

[15] 3,654,017
[45] Apr. 4, 1972

[54] PROCESS OF MAKING ARTICLES FROM FILMS OF THERMOPLASTIC MATERIAL

[72] Inventors: Richard L. Ropiequet; Margaret J. Montag, both of Portland, Oreg.

[73] Assignee: Alta Industries, Incorporated, Portland, Oreg.

[22] Filed: July 28, 1969

[21] Appl. No.: 852,963

[63] Continuation-in-part of Ser. No. 702,426, Feb. 2, 1968

[52] U.S. Cl. ............................................................156/251
[51] Int. Cl. .........................................................B32b 33/00
[58] Field of Search................156/251, 229, 306, 196, 85, 156/93, 61, 63, 81, 84; 161/85, 84; 99/171; 264/230

[56] References Cited

UNITED STATES PATENTS

| | | | |
|---|---|---|---|
| 3,414,181 | 12/1968 | Sloan | 264/230 X |
| 2,232,640 | 2/1941 | Schwartzman | 156/251 |
| 2,957,513 | 10/1960 | Schneider et al. | 156/251 |
| 2,980,566 | 4/1961 | Wohlfahrt et al. | 156/93 |
| 3,037,868 | 6/1962 | Rosser | 99/171 |
| 3,342,817 | 8/1967 | Young | 156/306 |
| 3,416,991 | 12/1968 | Yoshimura | 156/229 |

*Primary Examiner*—Benjamin A. Borchelt
*Assistant Examiner*—Daniel A. Bent
*Attorney*—Buckhorn, Blore, Klarquist and Sparkman

[57] ABSTRACT

A process is disclosed for making articles of ornamental or unusual appearances by cutting and heating operations performed on a plurality of layers of thermoplastic film material which has been stretched, preferably in two directions at right angles to each other, during manufacture, so as to fuse the layers of material together at least at their edges and in most cases cause contraction of the films in directions parallel to their faces and expansion in a direction perpendicular thereto. A particularly effective procedure is to form an elongated composite roll or bundle of the film material or rods of thermoplastic material or both and to then slice the resulting structure transversely into wafers. These wafers may be heated differentially to cause them to deform into unusual shapes. A number of different types of articles thus made are also shown.

14 Claims, 46 Drawing Figures

Patented April 4, 1972 3,654,017
3 Sheets-Sheet 1
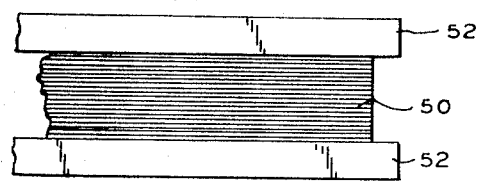
FIG. 1
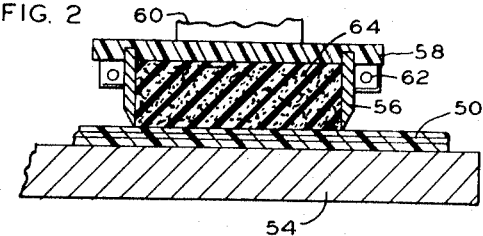
FIG. 2
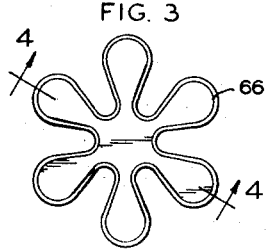
FIG. 3
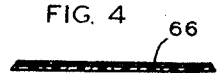
FIG. 4
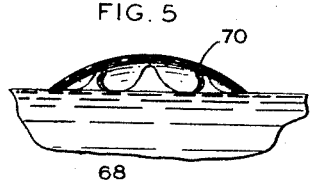
FIG. 5
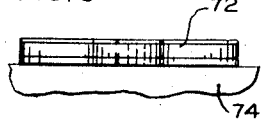
FIG. 6
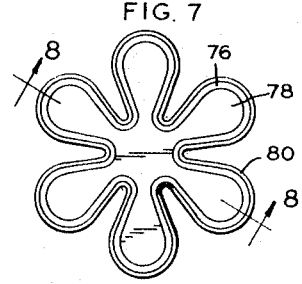
FIG. 7
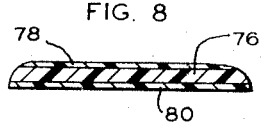
FIG. 8
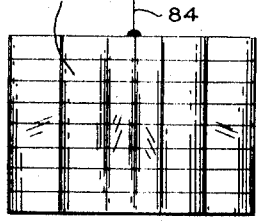
FIG. 9
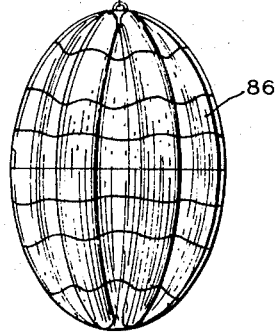
FIG. 10
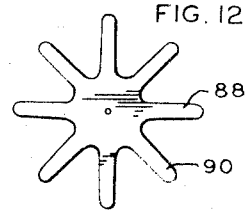
FIG. 11
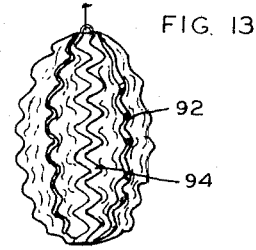
FIG. 12
FIG. 13
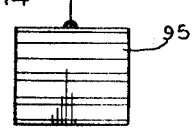
FIG. 14
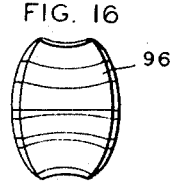
FIG. 16
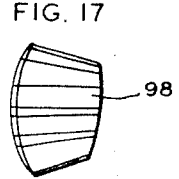
FIG. 17
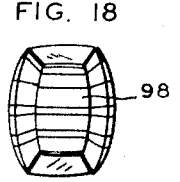
FIG. 18
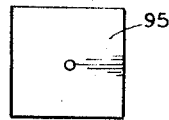
FIG. 15
RICHARD L. ROPIEQUET
MARGARET J. MONTAG
INVENTOR
BY
BUCKHORN, BLORE, KLARQUIST & SPARKMAN
ATTORNEYS

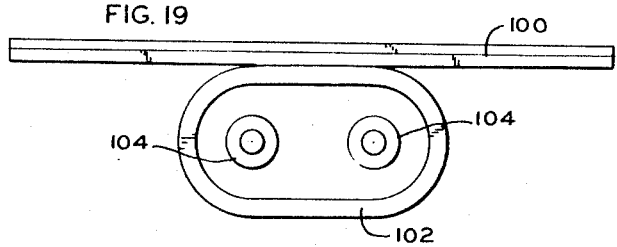
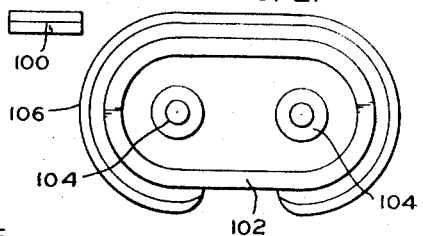
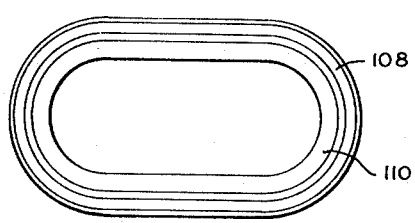
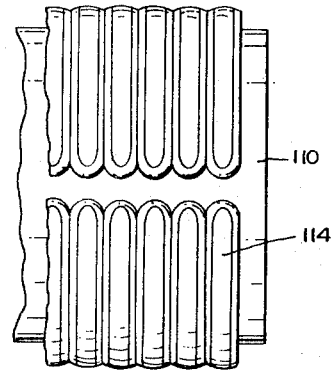
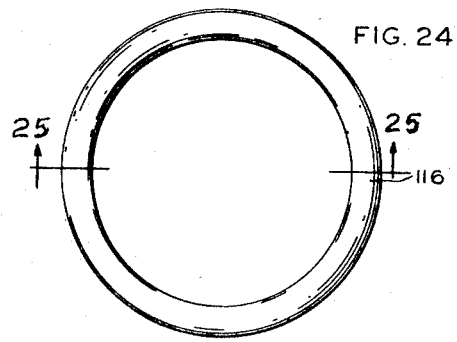
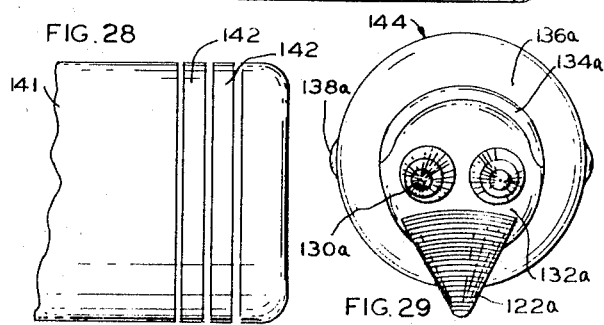
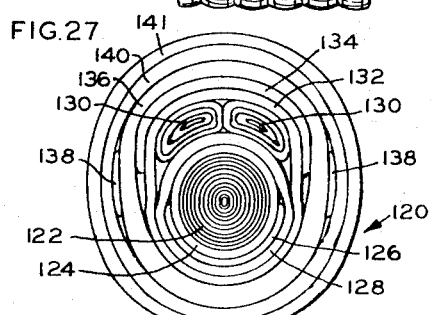
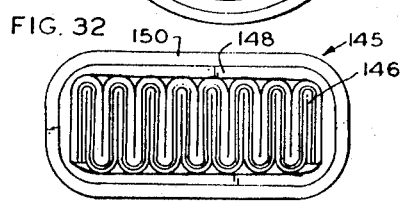
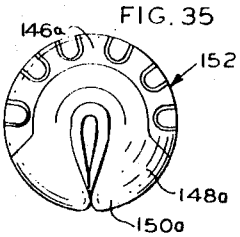
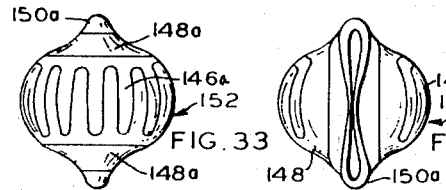
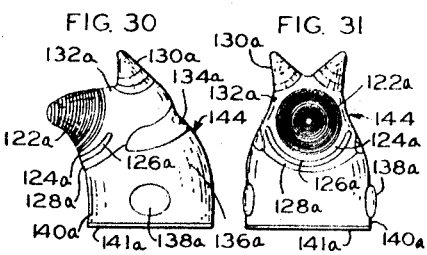

Patented April 4, 1972

RICHARD L. ROPIEQUET
MARGARET J. MONTAG
INVENTORS.

BY

BUCKHORN, BLORE, KLARQUIST & SPARKMAN
ATTORNEYS

PROCESS OF MAKING ARTICLES FROM FILMS OF THERMOPLASTIC MATERIAL

This application is a continuation in part of my copending application Ser. No. 702,426 filed Feb. 1, 1968.

FIELD OF INVENTION

The invention relates to a process of making articles from films of thermoplastic material which have been stretched during manufacture while the films are cooling from a heated plastic condition. Such films are referred to in the art as being made of biaxially oriented thermoplastic material if the stretching is substantially equal in two axes at right angles to each other, or of monaxially oriented thermoplastic material if the stretching has been primarily in one axis. The stretching and cooling leaves locked in stresses in the films and upon again heating the films these stresses will be relieved by shrinking along the axes of original stretching with a corresponding increase in thickness unless prevented by mechanical restraints.

It is difficult to make a film which is either completely biaxially or monaxially oriented so that available stretched films generally fall between these two extremes and will shrink in both length and width, but not equally, while increasing in thickness. In the present application the term "stretch oriented heat shrinkable thermoplastic film" has been employed to mean stretched thermoplastic films having an orientation between these two extremes, including those which approach either of such extremes, which films will shrink as described above when subjected to heating. Also the term "stretch oriented heat shrinkable thermoplastic material" will be employed to means both the material of the films just discussed and that of rods of thermoplastic material which have been longitudinally stretched while cooling from a heated plastic condition. When again heated to a plastic condition, such rods or short sections thereof will shrink in a longitudinal direction and expand in a transverse or radial direction unless prevented by mechanical restraints.

Articles of various shapes can be made by arranging a number of layers of the stretch oriented heat shrinkable thermoplastic film with their faces in contact with each other and pressed together to expel air and then cutting through the layers with a knife or die which has been heated to a temperature which will fuse the cut edges of the layers together. Alternatively the edges of layers cut in any other manner can be fused together by rapidly applying heat to such edges, for example, in an oven or heating chamber while the various layers are pressed together. The shrinking action of the layers which results in an increase in thickness of the heated edges, assists in causing such edges to fuse together in either of the cutting and heating operations discussed above.

Articles of greater structural strength can be made by fusing the layers together substantially throughout their contacting surfaces, for example, by holding the layers together in any suitable manner which restricts expansion of the layers in a direction perpendicular to such layers and relatively slowly applying heat until such fusion is accomplished. This fusing of the layers together can be done before or after the cutting operations referred to above.

Elongated rolls or bundles of folded layers can also be formed and cut transverse to the axis of the rolls or bundles into articles in the form of wafers by employing a plurality of spaced heated wires. These rolls or bundles will ordinarily have an outer wrapping made of a plurality of layers of the stretch oriented heat shrinkable thermoplastic film. These rolls or bundles will also usually have longitudinally extending smaller rolls or bundles of the film material in their interior or may have similarly longitudinally extending stretch oriented heat shrinkable rods of thermoplastic material as well as rods of thermoplastic material in which the material of the rods has not been stretch oriented or only slightly stretch oriented. The elongated rolls or bundles are sufficiently tightly rolled or compacted that wafers having the adjacent cut edges of the various components fused together by the heated wires will be self sustaining.

The articles made as above described can be further formed into ornamental or unusual shapes by heating various shaped articles for various length of time at various temperatures under conditions permitting the contraction and expansion discussed above. Such unusual shapes result from the fact that the plastic materials of the layers or of the rods when employed are, in general, good insulators so that the heat penetrates slowly from the outside to the internal parts. There is thus a thermal gradient during at least the initial portions of the heating operation which causes the stresses in the layers to be relieved and the article to change shape progressively from the surfaces of the object receiving the heat toward the portions of the article spaced from such surfaces. If the heat is applied differentially to the various surfaces of the article then, in general, the change of shape will occur asymmetrically. The heating can be stopped at any time so as to preserve the form of the object at that time.

Various layers or groups of layers of the stretch oriented heat shrinkable thermoplastic material or various thermoplastic rods may be of various colors so that further ornamental or unusual effects can be obtained.

The invention is therefore concerned with providing a novel process by which articles of ornamental or unusual shapes as well as having various color combinations may be readily produced from stretch oriented heat shrinkable thermoplastic material and is also concerned with providing such objects as articles of manufacture.

The process of the present invention and the articles produced thereby will be described in greater detail in conjunction with the attached drawings of which:

FIG. 1 is a diagrammatic view showing apparatus for pressing together a plurality of layers of stretch oriented heat shrinkable thermoplastic film;

FIG. 2 is a diagrammatic view showing apparatus for cutting articles from a plurality of such layers;

FIG. 3 is a plan view of an article cut by the apparatus of FIG. 2;

FIG. 4 is a sectional view of the article of FIG. 3 taken along the line 4—4;

FIG. 5 is a diagrammatical view of the article of FIGS. 3 and 4 floated on a heated liquid to cause or to assume a dished or cupped form;

FIG. 6 is a diagrammatic view of an article similar to that of FIGS. 3 and 4 but made of a greater number of layers and positioned on a heated plate;

FIG. 7 is a plan view of the article of FIG. 6 upon removal from the heated plate of such figure;

FIG. 8 is a sectional view of the article of FIG. 7 taken along the line 8—8;

FIG. 9 is a side elevation of an article similar to that of FIG. 7 but made up of a much greater number of layers with a wire attached for suspending in an oven;

FIG. 10 is a plan view of the article of FIG. 11;

FIG. 11 is a side elevation of t a article of FIGS. 9 and 10 after having been heated;

FIG. 12 is a plan view of another article similar to that shown in FIGS. 9 and 10;

FIG. 13 is a side elevation of the article of FIG. 12 after having been heated;

FIG. 14 is a side elevation of another article cut from a plurality of layers of the film and having a suspending wire attached;

FIG. 15 is a plan view of the article of FIG. 14;

FIG. 16 is a side elevation of the article of FIGS. 14 and 15 after having been heated by heat applied substantially uniformly from all directions;

FIG. 17 is the view similar to FIG. 14 showing the article after it has been heated by heat applied from one side thereof;

FIG. 18 is a side elevation of the article of FIG. 17 looking toward the left in FIG. 17;

FIG. 19 is a side elevation of another type of cut article which has been placed upon a heated mandrel;

FIG. 20 is an end elevation of the article only of FIG. 19;

FIG. 21 is a view similar to FIG. 19 showing the article wrapped around the mandrel as a result of a heating operation;

FIG. 22 is an end elevation of layers of film wrapped around a mandrel;

FIG. 23 is a plan view of the assembly of FIG. 22 after heating and cutting of the material wrapped around the anvil into open rings such as bracelets;

FIG. 24 is a top elevation of a ring of material cut from a plurality of layers of film after such layers have been fused together;

FIG. 25 is a sectional view of the ring of FIG. 24 taken on the line 25—25;

FIG. 26 is a view similar to FIG. 25 after heating to form the ring of FIGS. 24 and 25 into a bracelet or the like;

FIG. 27 is an end view of a roll containing various bundles of the film material;

FIG. 28 is a side elevation of the roll of FIG. 27 after heating and also showing several wafers cut from the roll;

FIG. 29 is a top plan view of an enlarged scale of the article resulting from heating one of the wafers of FIG. 28 in an oven;

FIG. 30 is a side elevation on a reduced scale of the article of FIG. 29;

FIG. 31 is a front elevation of the article of FIG. 29;

FIG. 32 is an end view of a roll similar to the roll shown in FIG. 27 but having a different internal structure;

FIG. 33 is a side elevation of the article produced by cutting a wafer from the roll of FIG. 32 and heating the wafer;

FIG. 34 is a side elevation showing the opposite side of the article of FIG. 33;

FIG. 35 is an end view on a slightly enlarged scale of the article of FIGS. 33 and 34;

Figure 45:
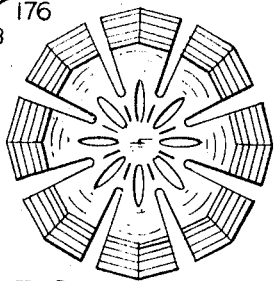
Figure 46:
Figure 39:
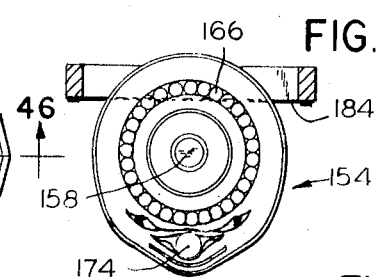
Figure 40:
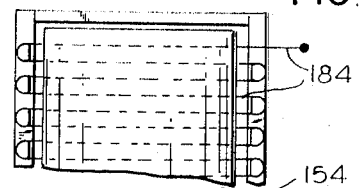
Figure 41:
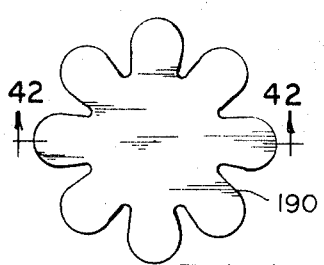
Figure 43:
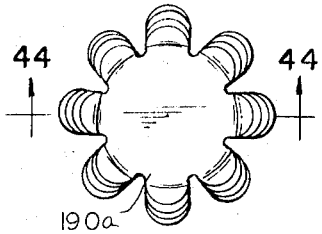
Figure 42:
Figure 44:

FIG. 39 diagrammatically illustrates on a smaller scale a device for simultaneously cutting a plurality of wafers from an elongated bundle or roll made of stretch oriented heat shrinkable thermoplastic material;

FIG. 40 is a bottom view of the device of FIG. 39;

FIG. 41 is a plan view of an intermediate article or blank made of a plurality of layers of the stretch oriented heat shrinkable thermoplastic film cut into the shape of a flower;

FIG. 42 is a vertical cross section taken on the line 42—42 of FIG. 41;

FIG. 43 is a plan view of the intermediate article of FIGS. 41 and 42 after being heated by radiant heat directed radially toward and upwardly with respect to the article of FIG. 41;

FIG. 44 is a vertical cross section taken on the line 44—44 of FIG. 3;

FIG. 45 is a plan view of another article made by cutting a blank similar to that of FIGS. 41 and 42 but having petal portions of another shape and heating by radiant heat directed downwardly against the upper surface of the blank; and FIG. 46 is a vertical cross section taken on the line 46—46 of FIG. 45.

Referring to the drawings, FIG. 1 shows a stack 50 made up of a plurality of layers of the stretched oriented heat shrinkable thermoplastic material discussed above positioned between a pair of plates 52. Plates 52 may be made of any suitable material such as aluminum and may be forced toward each other by a press or clamp (not shown) for the purpose of expelling air from between the layers of the stack 50 and causing superficial adherence between such layers. Alternatively the plates 52 may be clamped together in any suitable manner and the assembly including the stack 50 placed in an oven and subjected to a heating operation. If such heating operation is conducted at a relatively low temperature for a substantial period of time, the temperature being just sufficient to cause fusion of the surfaces of the layers 50 in contact with each other, the result is a solid body or board of the thermoplastic material in which the various layers are fused together throughout their surface areas. Such a fused article has substantial mechanical strength. On the other hand, if the heating is rapid as a result of the applications of heat at a relatively high temperature, for a short period of time, only the exposed edges of the layers of the stack 50 will be fused so that such layers will be adhered to each other only at their edges. In either case the layers are restrained from increasing materially in thickness and shrinking of the layers is therefor also restrained.

FIG. 2 diagrammatically illustrates a device for cutting a stack of the layers of film, such as the stack 50 of FIG. 1. This device includes a base member 54 for supporting the stack 50 and a reciprocable cutting die member including a cutting element 56 secured to a backing plate 58 of heat insulating material in turn attached to a press plunger 60. It will be understood that the cutting element 56 may extend entirely around the die in a pattern which corresponds to the desired shape of the article cut from the stack 50. An electric heating element 62 may be positioned in contact with the cutting element 56 so that such element may be heated to a temperature which will fuse the edges of the article cut from the stack 50 together. A sponge 64 of heat resistant resilient material, for example, sponge silicon rubber, may be employed to eject the cut out article from the die.

FIG. 3 illustrates one specific type of article 66 which may be cut from the stack 50 by a die such as shown in FIG. 2. For limited production, it is also possible to cut such article from the stack by use of a heated knife, such as a knife element attached to a soldering iron element or such cutting can also be performed by employing a heated wire as a saw blade. The various layers of the stack 50 have sufficient superficial adherence that articles such as shown in FIGS. 3 can be cut therefrom with a heated knife while the layers of the stack are held pressed together by the fingers of one hand of the operator and the knife is manipulated by the other hand.

The article 66 of FIG. 3 may be relatively thin as illustrated by the cross section shown in FIG. 4, i.e., may be made of relatively few layers of the film, and such article may be assumed to have only its edges fused together. In the flat forms illustrated in FIGS. 3 and 4, such an article may have various ornamental or unusual shapes and different layers or groups of layers of the film may be of different colors to provide an attractive appearance. Instead of being fused together at their edges only, the various layers of the article of FIGS. 3 and 4 may be fused together throughout their surface areas by clamping them between plates, such as the plates 52 of FIG. 1, and heating in the manner described above, and this may be done either before or after the articles are cut out from the stack 50.

As illustrated in FIG. 5, any of the types of articles described above with respect to FIGS. 3 and 4, i.e., articles having the edges only of the layers fused together or articles in which the layers are fused together throughout the surface areas, may be dropped on the surface of a heated liquid 68 shown diagrammatically in such figure, on which the article floats. The liquid 68 is at a temperature which will cause shrinking of the layers adjacent the lower surface of the article thus placed on the heated liquid. The article will rapidly be shaped or cupped into the form shown by the resulting article 70 of FIG. 5. Thus the articles 70 of FIG. 5 will still have the outline of the article 66 of FIG. 3 but the lobes of the article of FIGS. 3 and 4 will be bowed into the form of an attractive flower. The heating of the layers in contact with the liquid in FIG. 5 will cause such layers to adhere to adjacent layers and this action may take place between several or all of the layers of the article to increase its structural strength. If, however, the various layers of the article have been previously fused together as described above, the bowing will still take place.

Another article 72 is shown in FIG. 6 upon a heated plate, shown diagrammatically at 74. The articles 72 may have any suitable shape and, for example, may be similar to that of FIG. 3 except that it is shown as being substantially thicker, i.e., made up of a greater number of layers and being somewhat larger in size. The temperature of plate 74 can be adjusted so that the layers nearest the plate shrink and this shrinking decreases progressively for layers of the film spaced further from the plate so as to produce an article 76 of the shape shown in FIGS. 7 and 8. All of the edges of such article have rounded edge and an outer surface 78 having the same shape as the original cut out article 72 but reduced in size while the opposite face 80 retains substantially the shape and size of the original cut out article.

Another cut out article 82 which is very much thicker than the article 72 of FIG. 6 is shown in FIGS. 9 and 10. Such an article may have any desired shape but, for example, may have substantially the same shape as the article of FIG. 3 as is shown in FIG. 10. The article 82 of FIGS. 9 and 10 may be cut from a stack of layers of film with a heated wire or die so as to have its edges only fused together or may have its layers of film fused together throughout the article. This article is shown as having a suspending wire 84 attached to one of its faces centrally thereof to enable such article to be freely suspended in a heated atmosphere, such as in an oven. If the temperature of such heated atmosphere or oven is such that a temperature gradient is provided extending from the surface of the article 82 to its interior, shrinking will progressively take place from the outer surface inwardly of the article 82 to produce an article 86 such as shown in FIG. 11. It will be understood that a cross section of the article 86 taken at right angles to the vertical axis of the article in FIG. 11, will have generally the same outline as that shown in FIG. 10 but will have a smaller lateral dimension and a greater longitudinal dimension and that this lateral dimension will decrease from the median plane of the article progressively toward ends of the article.

Another cut out article 88 is shown in FIG. 12 and this article may be similar to the article 82 shown in FIGS. 9 and 10 except that the lobes 90 are relatively thin as compared to the lobes of the article 82. When this article is subjected to heating as above described by being suspended from a wire 84 in a heated atmosphere, the lobes 90 shrink in a manner tending to produce an article 92 having lobes 94 with uniform sinuous shapes such as illustrated in FIG. 13, particularly if the original article has a plurality of groups of layers of slightly different shrinking characteristics. This will usually be the case if the layers are of different colors or have been made at different times, even though made on the same apparatus and by the same process.

FIGS. 14 and 15 illustrate an article 95 made in a manner similar to the article 82 of FIGS. 9 and 10 except that the article has a simple rectangular configuration. Upon suspension in a heated atmosphere, for example, by the wire 84, the article assumes the curved shape shown by the article 96 of FIG. 16. The sides of such article have compound curvature and if the heat is applied from one side only, for example, by radiation from a heated plate at one side of the article, the change of form of the article is asymmetrical as illustrated by the article 98 shown in FIGS. 17 and 18.

Instead of suspending the articles shown in FIGS. 9, 10, 12, 13 and 15 in an oven or the like, similar heating operations may be carried on by inverting the articles shown in such figures and attaching their wires to a frame which is then submerged in heated liquid such as the heated liquid of FIG. 5. By correctly adjusting the temperatures of liquid, articles very similar to those shown in FIGS. 11, 13 and 16 can be produced. It will, of course, be understood that all of the heating operations thus far described will be discontinued when the articles have obtained the desired shape and this is also true of heating operations described below. The articles thus far described have utility, for example, earrings, pendants, necklaces and the like.

An elongated article 100 cut from a stack of the films of thermoplastic material in which the layers have been fused together throughout their surface areas is shown in FIGS. 19 and 20. The article 100 may, for example, be of the rectangular form shown in FIGS. 19 and 20, with the layers running longitudinally of the article. An article of this type may be caused to assume the shape of an open ring by placing the same upon the upper surface of a heated mandrel 102 with the layers of film extending generally parallel, for example, be a mandrel of the tubular form shown in FIG. 19. The mandrel may have electric heating elements 104 positioned therein. The mandrel may have any desired shape, for example, the shape shown in FIGS. 19 and 21, is suitable for a bracelet. The shrinking of the layers of material adjacent the mandrel will cause the article 100 to curve around the mandrel into an article 106 having the shape shown in FIG. 21.

Another way of making a bracelet 108, similar to the bracelet 106 of FIG. 21, is illustrated in FIGS. 22 and 23. In FIG. 22, a plurality of layers 108 of the thermoplastic film are shown as being wound upon a mandrel 110. The layers 108 are built up to the desired thickness and may include groups of layers of various colors. The layers upon the mandrel may then be heated by heating the entire assembly in an oven. After the heating operation the layers of material may be cut into a series of open rings 114 by a heated cutting element, for example, a heated knife or die, and the resulting articles removed from the mandrel.

The making of another type of ring, bracelet, is illustrated in FIGS. 24 to 26, inclusive. A ring of material 118 is cut from a pile of layers such as the pile of layers 50 of FIG. 1 by any suitable cutting element, for example, a heated die. The cross section of the resulting cut out ring is shown in FIG. 25 and the resulting article 118 after being heated, for example, by placing it upon a tubular mandrel and then heating in an oven or by immersion in a heated liquid, is shown in FIG. 26.

FIG. 27 shows an end of an elongated bundle 120 of layers in the form of a roll containing a plurality of smaller bundles or rolls. The bundle 120 is made by first forming one or more smaller bundles of the film of thermoplastic material. Thus a smaller bundle 122 in the form of an elongated cylindrical roll shown in FIG. 27 was first prepared. This bundle was then wrapped with a plurality of layers 124 of a color which contrasted with the colors of the roll 122. Another smaller bundle 126 made up of a flat roll of film of still another color was positioned to extend approximately half way around the layers 124 as also illustrated in FIG. 27. This assembly was then employed as a core about which a plurality of layers 128 of film was then wrapped and in a specific example these layers had the same color as the layer 124. The smaller bundles 130 in the form of flattened rolls were then superimposed upon the wrapped layers 128 on the side of the assembly thus far prepared opposite the flat roll 126. These bundles were made by stacking groups of layers of film, for example, three, in which each group of layers had a contrasting color and wrapping the stack into a roll. Another wrapping of layers 132 of the film of the same color as layers 124 was then applied. Another flattened roll 134 was then placed on the wrapped layers 132 on the same side of the assembly as the bundles 130. Another relatively thick wrapping 136 of layers of film of a contrasting color was then applied and then two further smaller flattened rolls 138 of another color were applied to the sides of the assembly followed by another wrapping 140 of a plurality of layers of the same color as layers 136 and still another wrapping 141 of a different color.

The end view of the bundle of FIG. 27 is an idealized view as in actual practice some of the layers will project from the end of the bundle farther than others and will be bent inwardly to obscure some of the layers, but such idealized end view is useful in describing the procedure by which the large elongated bundle was assembled.

The completed bundle assembled as described above was then heated in an oven at a relatively low heat for sufficient time to cause all of the various layers in the assembly to have their contacting surfaces fused together into a composite member in the form of the roll or bundle 122 of FIG. 28. The heating caused the layers to contract somewhat in length and width and correspondingly expand in thickness to fill all voids which might be left in the interior of the bundle and cause the various layers to merge into a solid body 141 of the elongated cylindrical shape shown in FIG. 28.

As indicated in FIG. 28, the elongated solid body 141 was cut into a plurality of wafers 142. Each wafer had essentially the appearance of the end of the bundle 120 shown in FIG. 27, somewhat reduced in size. A wafer 142 was then placed on the heated but relatively cool floor of an oven and was subjected to radiant heat directed against the upper surface thereof. The heat caused the outer wrapped layers to shrink so as to decrease the diameter of the wafer and the heat applied to the upper edges of the cut layers caused such edges to increase in thickness and also made the body of the wafer sufficiently plastic that the central portion of the wafer extruded in a direction generally perpendicular to the faces of the wafer to form an article 144 of the shape shown in FIGS. 29, 30 and 31. In the case of a wafer cut from a bundle which has been heated as above described, this extrusion is usually upwardly away from the floor of the oven and toward the source of radiant heat but particularly with wafers cut from bundles which have not been heated and which contain voids as described below, the extrusion may be in the opposite direction.

The corresponding portions of the end of the bundle 120 shown in FIG. 27 and the resulting formed article 144 are given the same number in FIGS. 29, 30 and 31 as they are in FIG. 27, except that the reference numerals in FIGS. 29, 30 and 31 are followed by a small *a*.

As indicated above, the various bundles and wrappings of FIG. 27 were, in general, made of different colors and in the case of the portion 122, the roll was made of alternate layers of film of different colors so that the result was closely spiraled lines of different color in the final product 144. Also the portions 130 were made up of concentric rolls of three different colored film materials so as to give the effect of protruding eyes. The result was a hollow article of considerable mechanical strength having the appearance of a grotesque head. By varying the nature and number of the bundles of film, a wide variety of unusual articles can be produced.

As another example, FIG. 32 shows the end of a roll 145 similar to that described with reference to FIG. 27. This bundle was made by first forming a stack of layers made of three groups of layers of the film material in which the lower and upper groups were of different colors and were separated by another thinner group of a third color. This stack of material was folded back and forth upon itself to form a folded core 146 which was then tightly wrapped by two separate wrappings 148 and 150 of different colors, the inner one of which was the same color as that of one of the outer folded groups of layers of the core 146. The resulting bundle was then heated as described above with reference to FIG. 27 to cause the contacting surfaces of the various layers to fuse to each other and then was cut into wafers as also described above, One of such wafers was then heated in the same manner as the wafer 142 as described above and the result was to form the article 152 shown in FIGS. 33, 34 and 35. This was a hollow article having the general appearance of a seashell.

Again the reference numerals for the various wrappings and bundles shown in FIGS. 32 have been applied to the article 152 of FIGS. 33, 34 and 35 with an *a* attached to indicate the corresponding portions. As stated above, the inner wrapping 148 was of the same color as one of the groups of layers of film of the folded bundle 146 so that these materials merged in the final heating so as to be indistinguishable in the final article.

Figure 36:
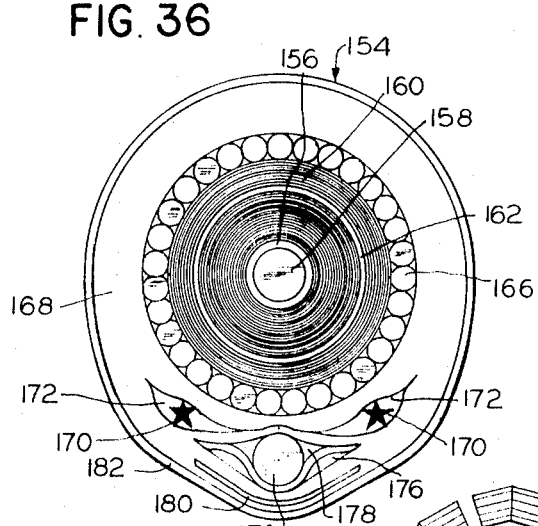
FIG. 36 is a view similar to FIG. 27 of another type of roll or bundle containing rods of stretch oriented heat shrinkable thermoplastic material as well as film of such material.

FIG. 36 illustrates another type of bundle or roll 154 having longitudinally extending lengths of stretch oriented heat shrinkable thermoplastic rods therein. This roll or bundle is made by first wrapping layers 156 about a central rod 158, which layers in a specific example were of the same color as the rod. Alternating layers of contrasting colors were then wrapped about the layers 156 to provide a spiral of layers 160. Another wrapping of layers 162 of the same color as the rod 158 was then applied followed by another spiral of layers 164 of the same colors as the layers 160.

A plurality of rods 166 of the same material and color as the rod 158 but of smaller diameter were then arranged around the layers 164 and the resulting assembly wrapped with further layers 168 of a somewhat different color than that of the rods 166. Two rods 170 of star-shaped cross section and of a darker contrasting color were then positioned as shown in FIG. 36 and the wrapping of the layers 168 continued to leave voids 172 in the bundle or roll. The rods 170 were not stretch oriented to any substantial extent.

Another circular rod 174 of the stretch oriented heat shrinkable thermoplastic material of substantially the same color as the layers was then positioned below and between the rods 170 and the wrapping of the layer 168 continued to leave the voids 172 and 176. A flat bundle of layers 178 of another darker contrasting color was then added below the rod 174 and the wrapping of the layers 168 continued. A final wrapping of layers 182 of another darker contrasting color was then added.

The bundle 154 without any preliminary heating was then cut into a plurality of wafers by a plurality of spaced parallel portions of an electrically heated resistance wire 184 held in an insulating frame 186 as indicated diagrammatically in FIGS. 39 and 40. The hot wires fused and sealed together the adjacent edges of the cut layers and the edges of the layers and rods to form an article of considerable mechanical strength.

Figure 37:
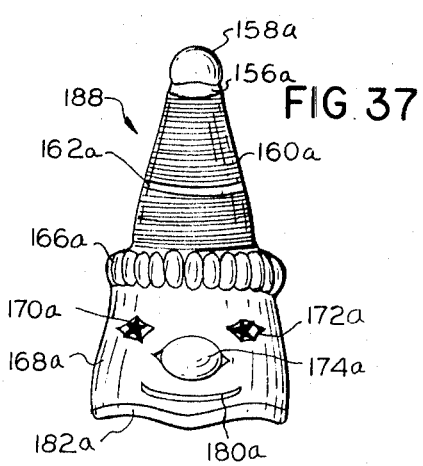
FIG. 37 is a front view of the article produced by applying heat to one surface of a wafer cut from the roll or bundle of FIG. 36.
Figure 38:
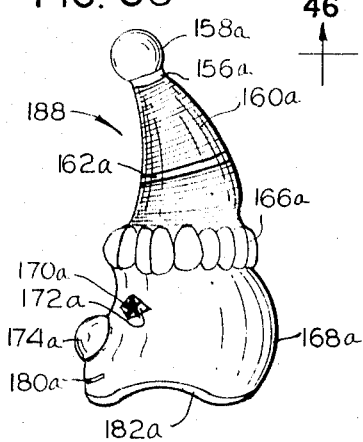
FIG. 38 is a side view of the article of FIG. 37.

When these wafers were heated by radiant heat applied to their upper surfaces, they each deformed into a hollow article 186 of the type shown in FIGS. 37 and 38. The reference numerals employed in FIG. 36 with the letter *a* added thereto have been applied to parts of FIGS. 37 and 38 which correspond to the various elements of FIG. 36. In each case the short sections of the rods 158, 166 and 174 were extruded outwardly from the surface of the wall of the final article 188, since these rods expanded radially while the layers surrounding them contracted. The sections of the rods 170 were of sufficiently small diameter relative to their length and were made of a thermoplastic material which did not expand or otherwise change their shape appreciably upon heating of the wafer so that they remained in position within the wall. The voids 176 and 178 surrounding the portions of the rod 174 in the wafer closed as did the small voids which were adjacent the portions of the rods 166. The voids 172 surrounding the portions of the rods 170 did not, however, quite close but remained in the approximate shape of a human eye. The rods 170 each provided a star-shaped pupil for one of the eyes.

FIGS. 41 to 45 illustrate the effects of cutting a plurality of flat superimposed layers of the stretch oriented heat shrinkable film into different shapes and applying heat in a different manner. Thus the article of blank 190 of FIG. 41 may have the cross section 190 shown in FIG. 42 and may be cut into the shape of a flower, for example, by a hot wire. Upon being heated by radiant heat directed downwardly and radially inwardly toward the blank or article 190 of FIGS. 41 and 42 substantially uniformly around the blank, a resulting article 190*a* having the cross section of FIG. 44 and the appearance in plan shown in FIG. 44 was produced.

A blank similar to that shown in FIGS. 41 and 42 but cut with somewhat different shaped petal portions and heated by radiant heat directed downwardly toward the top of the blank resulted in an article of the type shown in FIG. 45 having the vertical cross section shown in FIG. 46.

The temperatures at which shrinkage occurs extends over a wide range from low temperatures at which the material just begins to creep to a temperature at which the thermoplastic material becomes of such low viscosity that it no longer transmits stresses. At low temperatures, expansion tends to be more uniform throughout the article since the rate of shrinkage is low compared to the rate of heat propogation through the article from the outside surface. At sufficiently low temperatures the material of the layers maintains a nearly uniform temperature throughout and the shrinkage and expansion effects are substantially uniform throughout. Under these conditions an article made of layers of the material will expand uniformly in a direction normal to the layers and shrink uniformly in a direction parallel to the layers.

At higher temperatures there will be a large difference in the shrinkage of the outside of the article compared to the inside. Shrinkage will take place very rapidly and unusual effects obtained. The timing of the heating to obtain the desired shape is quite critical at high temperatures so, in general, a lower temperature which will give the desired effect will be employed in order to be able to obtain better production control.

The choice of time and temperature is also somewhat dependent upon the desired physical properties of the finished article. Plastic materials which have been stretch oriented are normally much stronger and less brittle than those which have not been so treated. Thus if the heating cycle is long enough to produce complete shrinkage, the material changes from a tough to a brittle condition. If is therefor normally desirable to stop the heating before a completely shrunk or non oriented material has been produced. Also heating tends to change the colors of dyes and some pigments and avoidance of over heating is desirable to prevent this from happening.

The most desirable film thus found is a foamed polystyrene sheet having a density of 14 to 18 pounds per cubic foot which has been stretched substantially equally along two axes. With this material suitable temperatures for shrinking of the material range from approximately 160° to 385° F. Desirable effects, however, can be achieved at oven temperatures or temperatures of other heat sources much higher than this, since it is the actual temperature of the material of the article being heated which is of importance. At the higher temperatures there is considerable risk of discoloration and embrittlement and also a tendency for the surface to melt before the surface layer has had sufficient time to exert any appreciable influence upon the shape of the article.

The rods of stretch oriented heat shrinkable material may also be of foamed polystyrene. A suitable way to form the rods is to extrude the heated material through an orifice of suitable size and pull or apply tension to the rods while they are in a semiplastic condition.

Various ways of supplying the heat for expanding the stretch oriented thermoplastic material have been employed. The article to be heated can be placed in an oven and contacted by hot air or by a vapor such as steam or a vapor of higher boiling liquid which does not react with the particular material being heated. The glycols and glycolethers, for example, are suitable liquids for heating the polystyrene mentioned above. Also heating of the articles can be achieved by immersing or floating them in a high boiling point liquid such as ethylene glycol or proplylene glycol or glycerin, although glycerin tends to solubilize some of the organic dyes normally used in making colored films. Radiant heat with the article suspended in the open or resting on a surface can also be employed.

Heating has also been accomplished by placing articles upon a hot plate. Any time a hot surface such as a hot plate or a hot mandrel is employed, it is, however, desirable to use a release film such as "Teflon" or silicone rubber on the heated surface.

By employing temperatures within the general limits above discussed, it is possible to take a series of identical blanks or composite articles, made as above described of layers of stretch oriented heat shrinkable thermoplastic films, and produce a variety of shapes by varying the heating steps employed, for example, by varying the temperatures to which the part is subjected or the time to which the article is subjected to heat, or both, or by varying the manner in which the heat is imparted to the article.

Although the preferred material for the heat shrinkable film is foamed polystyrene made into a thin film and then stretched substantially uniformly along two axes at right angles to each other to a much thinner film and the preferred material for the heat shrinkable rods is extruded and stretched foamed polystyrene, it is the physical properties of the material rather than its chemical composition which is of importance and any other thermoplastic material which is similarly stretched or oriented during manufacture and which at least partly returns to its original shape when heated can be employed to produce articles of the type above described. The time and temperatures required for the different changes in shape will vary with the physical characteristics of the particular plastic employed. It is easy to establish the temperature at which shrinking in one direction and expansion in another begins and also the temperature at which the thermoplastic material becomes too fluid to exert a force on other portions of the article. Temperatures between these extremes can be employed and varied to produce a desired result and as pointed out above, the time and temperature of heating should not, in general, be sufficient to completely relieve the stresses in the oriented material since this tends to produce a brittle final article.

While the cutting described above is usually done by employing heated cutting elements, it is possible to cut stacks or bundles of layers of oriented thermoplastic material with saws, particularly if such stacks or bundles have been heat treated to fuse the various layers together. Fine-toothed wood-working saws are in general suitable, particularly if a spray or a stream of water is employed at the cutting position to prevent frictional heat from softening or melting the material and causing resultant gumming of the same.

Any of the articles described above, after they have been brought to their desired form, can be stabilized against deformation due to heating by exposing them to radiation such as gamma rays, X-rays or high velocity electrons. This type of treatment causes cross linking of the chain-like polymer molecules so as to inhibit shrinkage of the polymerized material. It is also possible to produce novel effects by causing differential deformation of selected portions of an article when heat is applied to the article by exposing portions of the article to radiation through a mask or otherwise prior to the application of the heat.

The articles described above are useful for jewelry or other ornaments. Articles having exposed surfaces which were originally surfaces of the film will in general have a high polish on such surfaces. Other surfaces can be given a high polish by fine grained abrasive material, such as fine sandpaper or emery paper or cloth, particularly if water is employed to keep the abrasive material wet.

We claim:

1. The process of making an article of thermoplastic film material which comprises:
   arranging a number of layers in excess of two of stretch oriented heat shrinkable thermoplastic film material with faces of at least portions of adjacent layers in contact with each other to form a composite member;
   cutting in a direction extending through the layers of said composite member and through said portions to cut a discrete element from said composite member and expose cut edges of said layers at the surface of said element; and
   applying heat to said material during said process to fuse together at least the edges of parts of said portions of said layers;
   said process including arranging said layers in a flat pile of superimposed layers in which the element thus produced has a dimension parallel to said layers which greatly exceeds the dimension of said element perpendicular to said layers to provide opposite exposed major surfaces extending parallel to said layers; and
   said process also including applying heat differentially to one of said major surfaces relative to the other to cause shrinking of the layers adjacent said one major surface in a direction parallel to the heated layers.

2. The process defined in claim 1 in which said heat is applied by placing said element on the surface of a heated liquid in which said element floats and which is inert with respect to said material in order to cause dishing of said element.

3. The process of making an article of thermoplastic film material which comprises:

arranging a number of layers in excess of two of stretch oriented heat shrinkable thermoplastic film material with the faces of at least portions of adjacent layers in contact with each other to form a composite member;

cutting in a direction extending through the layers of said composite member and through said portions to cut a discrete element from said composite member and expose cut edges of said layers at the surface of said element; and applying heat to said material during said process to fuse together at least the edges of parts of said portions of said layers;

said process including heating said composite member substantially throughout while said composite member is prevented from expanding in a direction perpendicular to said layers to cause at least partial fusion and adherence of the contacting surfaces of adjacent layers of said material without substantial contraction of said composite member in directions parallel to said layers.

4. The process defined in claim 3 which includes:

suspending said element cut from said composite member having at least partial fusion and adherence of said layers in a heating chamber and applying heat to the exposed surfaces thereof so as to cause contraction of sad layers in directions parallel to said layers and expansion in a direction perpendicular to said layers.

5. The process defined in claim 4 in which the dimension of said element in a direction perpendicular to said layers approaches that of the greatest dimension thereof parallel to said layers and the heat applied to said element causes greater contraction of the layers adjacent the surfaces of said element extending parallel to said layers than the layers midway between said surfaces.

6. The process defined in claim 4 in which the dimension of said element in a direction perpendicular to said layers greatly exceeds the dimension parallel to said layers and heat is applied differentially to a surface of said element having exposed edges of said layers with respect to an opposite surface to cause said element to curl into an open ringlike product.

7. The process of making an article of thermoplastic film material which comprises:

arranging a number of layers in excess of two of stretch oriented heat shrinkable thermoplastic film material with the faces of at least portions of adjacent layers in contact with each other to form a composite member;

cutting in a direction extending through the layers of said composite member and through said portions to cut a discrete element from said composite member and expose cut edges of said layers at the surface of said element; and applying heat to said material during said process to fuse together at least the edges of parts of said portions of said layers;

said process including wrapping a plurality of layers of said material upon a mandrel and applying heat to fuse together the contacting surfaces of adjacent layers of said material and form said composite member; and cutting said composite member into open ringlike discrete elements and removing said ringlike elements from said mandrel.

8. The process of making an article of thermoplastic film material which comprises:

arranging a number of layers in excess of two of stretch oriented heat shrinkable thermoplastic film material with the faces of at least portions of adjacent layers in contact with each other to form a composite member;

cutting in a direction extending through the layers of said composite member and through said portions to cut a discrete element from said composite member and expose cut edges of said layers at the surface of said element; and applying heat to said material during said process to fuse together at least the edges of parts of said portions of said layers;

said process including arranging layers of said material in a generally cylindrical elongated bundle so as to extend axially of said bundle with at least the outer layers wrapped circumferentially around said bundle to form a composite member;

said process also including heating said bundle to cause the layers thereof to adhere together to form said composite member having a shape similar to that of said bundle; and cutting said composite member in a direction generally laterally of the longitudinal axis of said composite member to produce a disclike discrete element with the cut edges of layers of said material exposed on the faces of said disclike element.

9. The process of making an article of thermoplastic film material which comprises:

arranging a number of layers in excess of two of stretch oriented heat shrinkable thermoplastic film material with the faces of at least portions of adjacent layers in contact with each other to form a composite member;

cutting in a direction extending through the layers of said composite member and through said portions to cut a discrete element from said composite member and expose cut edges of sad layers at the surface of said element; and applying heat to said material during said process to fuse together at least the edges of parts of said portions of said layers;

said process including arranging layers of said material in a generally cylindrical elongated bundle so as to extend axially of said bundle with layers wrapped circumferentially around said bundle to form a composite member;

said process also including cutting said composite member in a direction generally laterally of the longitudinal axis of said composite member to produce a disclike discrete element with the cut edges of layers of said material exposed on the faces of said disclike element.

10. The process defined in claim 9 which includes applying heat to said disclike element to cause said element to deform into a hollow article as a result of differential contraction of said layers in the direction of such layers and expansion perpendicularly of said layers.

11. The process defined in claim 10 in which a plurality of individual elongated smaller bundles of said plastic sheet material are placed in the central portion of the first mentioned bundle so as to extend longitudinally thereof.

12. The process of claim 10 in which at least one elongated smaller bundle is placed in the interior of the first mentioned bundle and has a plurality of layers of said plastic sheet material which are superimposed and then folded into a plurality of loops in contact with each other.

13. The process of claim 10 in which at least one rod of stretch oriented heat shrinkable thermoplastic material is placed in said bundle so as to extend longitudinally of said bundle.

14. The process of claim 10 in which a plurality of rods of stretch oriented heat shrinkable thermoplastic material are placed in said bundle so as to extend longitudinally of said bundle and are positioned to form a ring of said rods around a portion of the interior of said bundle.

* * * * *